(12) United States Patent
Van Schie

(10) Patent No.: US 7,455,764 B2
(45) Date of Patent: Nov. 25, 2008

(54) APPARATUS FOR CONTINUALLY SKIMMING OFF A TOP LAYER OF A BODY OF LIQUID

(75) Inventor: Louis Van Schie, Vlijmen (NL)

(73) Assignee: Suparator International, B.V., CB Vlismen (NL)

(*) Notice: Subject to any disclaimer, the term of this patent is extended or adjusted under 35 U.S.C. 154(b) by 35 days.

(21) Appl. No.: 11/629,243

(22) PCT Filed: Feb. 17, 2005

(86) PCT No.: PCT/US2005/005081

§ 371 (c)(1),
(2), (4) Date: Dec. 11, 2006

(87) PCT Pub. No.: WO2006/088458

PCT Pub. Date: Aug. 24, 2006

(65) Prior Publication Data

US 2008/0029446 A1    Feb. 7, 2008

(51) Int. Cl.
*E02B 15/10* (2006.01)
*C02F 1/40* (2006.01)

(52) U.S. Cl. .............. 210/122; 210/242.3; 210/540; 210/923

(58) Field of Classification Search .......... 210/923, 210/242.3, 776, 121, 122, 540; 405/99, 100
See application file for complete search history.

(56) References Cited

U.S. PATENT DOCUMENTS

| 4,405,458 A | * | 9/1983 | McHugh, Jr. ............ 210/242.3 |
| 4,892,666 A | | 1/1990 | Paulson |
| 5,498,348 A | * | 3/1996 | Plink et al. .................. 210/776 |
| 6,287,460 B1 | | 9/2001 | Van Schie |

FOREIGN PATENT DOCUMENTS

| DE | 19512279 A1 * | 10/1996 |
| JP | 11-350465 | 12/1999 |

* cited by examiner

*Primary Examiner*—Terry K Cecil
(74) *Attorney, Agent, or Firm*—Dennis G. LaPointe

(57) ABSTRACT

An apparatus for continually skimming off a top layer of a body of liquid, comprising: a self adjusting container for collecting a top layer, the container being adapted to seek an effective balanced position dependent on the liquid level for collecting the top layer, and a discharge conduit for discharging the top layer collected by the container, wherein the container is tiltably coupled to a discharge conduit. A feeding inlet is provided through which the top layer is collected. A bearing made of friction reducing material is provided between the container wall and discharge conduit, with a clearance to minimize frictional contact and to allow leakage flow from the body of liquid into the container.

19 Claims, 4 Drawing Sheets

APPARATUS FOR CONTINUALLY SKIMMING OFF A TOP LAYER OF A BODY OF LIQUID

The invention relates to an apparatus for continually skimming off a top layer of a body of liquid, comprising: a self-adjusting container for collecting said top layer, said container being adapted to seek an effective balanced position dependent on the liquid level for collecting the top layer, and discharge means for discharging the top layer collected by said container, wherein said container is tiltably coupled to said discharge means.

BACKGROUND

Surface weirs have long had widespread use as a means of controlling or measuring liquid flow rates. They are used in devices to skim liquid surfaces of unwanted materials and also in apparatus for separation of liquids having different densities. Chemical manufacturing processes, water treatment process, waste treatment processes and water pollution cleanup operations all use separating, flow regulating or skimming devices.

There is a variety of skimming devices in the prior art. One such skimmer is a weir skimmer, which typically comprises a barrier wall of adjustable height which allows oil floating on water to flow over the wall and into a collection trough while excluding water. Recovered oil is then continuously pumped from the collection trough to a storage or transport means. Weir skimmers operate well in calm water with large or contained spills which produce a relatively thick oil layer.

Disc skimmers ordinarily include a plurality of discs spaced apart coaxially along a rotating shaft which may be supported by floats to position the lower portion of the discs in the water. Oil contacts and adheres to the rotating discs and is removed by blades or wipers which direct the collected oil into a sump or other collection means.

Drum skimmers have also been used for removal of oil and other hydrocarbons from water surfaces. A drum skimmer consists of one or more large rollers, or drums, which rotate partly submerged in water. Oil attaches to the drum surface as the drum rotates through the oil-water interface. The attached oil is then removed by squeezing or scraping the oil from the drum surface.

Most of the weir devices in use as separating, regulating or skimming apparatus are somewhat limited in operation and applications. One such device is disclosed in U.S. Pat. No. 4,405,458 to McHugh, Jr. which can be mounted in a fixed installation, such as a connection to a standpipe or as a floating unit. The unit utilizes a float supported weir that is unattached to the apparatus, except for contact with an adjustable retainer, which sets the weir elevation and flow rate.

The pivoting weir is mounted within a close fitting guide collar which guides weir movement and provides a practical or liquid seal between these members. The liquid seal provides a lubricating film to insure free vertical movement. The unit responds to flow interruptions caused by disturbances or variations in the flow rate of the piping system connected to the unit. Flow rate fluctuations result in the lowering of the inside liquid level and a corresponding lowering of the weir edge.

U.S. Pat. No. 5,498,348 to Plink et al. discloses a mobile floating surface skimmer comprising a vessel having an inlet through which liquid from the surface of the body of liquid can flow into the vessel together with the debris and/or contaminants. An outlet is connected to a pump for removing liquid, together with the debris and/or contaminants from the vessel. A valve controls the flow of liquid into the vessel in response to the level of the liquid to maintain the inlet near the surface of body of the liquid wherein the valve is provided with a delayed response to cause the skimmer to oscillate vertically in the body of liquid so the debris is prevented from becoming lodged at the inlet. German patent DE 19512279 A1 to Becker discloses a device which is constructed such that the device rotates about an axis of rotation, however, the discharge means is connected rigidly to the collecting container. The discharge means is a hose which significantly influences the position of the container itself, relative to the top floating layer that is to be removed. Since the force exercised on the collecting container by the discharge hose is not only dependent on the weight of the hose, but also on the contents of the hose, the operation of the device is problematic in many applications. In addition, the German patent device functions discontinuously, in that it rocks back and forth, filling up with fluid in the forward position and discharging at the backward position. Further, this device can only be used in conjunction with floating elements, while the present invention can be used without the use of floating elements, that is, the discharge pipe can be mounted into the side of a tank containing the liquid media. The device described in the German patent can not be used in this manner.

None of the above prior art devices are as effective in skimming off thin top layers as the instant invention or they are more complex devices which are more expensive to manufacture and to maintain. More importantly, none of the above prior art devices are structured such that the discharge or suction line acts as an axis about which the collecting container rotates and self-adjust.

U.S. Pat. No. 6,287,460 discloses an improved skimmer or collecting container adapted to rotate over or about an effluent pipe. In operation, the collecting container will swivel back and forth about the axis through its asymmetrical tilting self-adjustment evolutions. The direction, and the angle of the swiveling movement results from the difference between the incoming flow into the vessel and the flow out through the effluent pipe. The construction provides a more or less self-adjusting system which is sensitive to limited flow and liquid level variations. However, the known skimmer also has multiple drawbacks. A major drawback of the known skimmer is that it has been found that there is always a certain degree of friction between the collecting container and the pipe, as a result of which the capacity of self-adjustment of the collecting container is merely present in cases where the driving force applying on the collecting container, required for making the container rotate in case of liquid level differentials, exceeds the frictional force applying between the collecting container and the pipe. In particular in an extreme substantially horizontal or lying position of the collecting container, it frequently occurs that the frictional momentum exceeds the driving moment, as a result of which the self-adjusting capacity is no longer present. In this latter case the collecting container will not tilt on its own power in case of increasing liquid level, but an external (manual) force is required to tilt the collecting container such, that the driving force will exceed the frictional force again, and hence to recover the self-adjusting capacity of the collecting container.

It is an object of the invention to provide an apparatus for continuously skimming off a top layer of a body of liquid having an improved self-adjusting capacity.

SUMMARY OF THE INVENTION

The object of the invention can be achieved by providing an apparatus characterized in that the container is designed such, that the tilting moment of the container caused by a buoyancy of the container, the buoyancy being a result of a liquid level differential, exceeds a frictional moment independent of the orientation of the container, the frictional moment being a result of the mutual cooperation of the container and the discharge means. By retaining a relatively high tilting moment with respect to the frictional moment in any orientation of the container, the container is given (under normal operating conditions) a permanent self-adjusting capacity. In this manner, jamming of the container and hence loss of the self-adjusting capacity due to a relatively high degree of friction with respect to the driving force can be prevented. Even in situations with relatively low liquid levels, the tilting moment, preferably largely, exceeds the frictional moment of the apparatus. To secure a permanent self-adjusting capacity of the tiltable container, the center of buoyancy of the container, and eventually a part of the body of liquid, is preferably positioned at a (large) distance of the rotatable connection of the container and the discharge means.

To optimize the degree of freedom of design of the container, it is advantageous that the apparatus further comprises a feeding inlet coupled to said container for skimming the top layer of said body of liquid and feeding the container with the skimmed top layer. In this manner, both the container and the feeding inlet can be designed in an optimal way to realize the permanent self-adjusting capacity of the container, and in particular of the assembly of the container and the feeding inlet. Said feeding inlet preferably comprises a skimming mouth, wherein said mouth is positioned at a distance of the container. By positioning the skimming mouth at a distance of the container, the design of the container and the feeding inlet can further be optimized. Besides a permanent self-adjusting capacity of the apparatus, a further advantage of the apparatus is that the apparatus, in particular the skimming mouth, can be tilted over a relatively large distance with respect to the displacement of the skimming mouth of a conventional skimming apparatus having an identical internal collecting and storage volume. In particular the vertical displacement of the skimming mouth can be increased significantly, as a result of which the apparatus according to the invention is adapted to function in a normal manner in a relatively broad range of liquid levels.

In a preferred embodiment, a container encloses a collecting volume connected to a feeding inlet, wherein a volume extends to and beyond a side of the discharge means opposite to the mouth. In this manner, an improved distribution of available collecting volume can be realized to secure the self-adjusting property of the apparatus. The feeding inlet preferably comprises opposite side walls, an upper wall, and a lower wall opposite to said upper wall, the edges of which walls defining the mouth, wherein the upper wall and a lower wall are, more preferably, oriented tapered in direction of the mouth.

The container may have an arbitrary shape and geometry, provided that the container will have a permanent self-adjusting capacity. However, preferably, the container is substantially scroll-shaped (generally 6-shaped) or voluted, wherein the container can be formed by a scroll case. In this latter embodiment the discharge means is preferably coupled to an eccentric position of a lower part of the apparatus in order to optimize to an advantageous self-adjusting property on one side, and to maximize the possible vertical displacement of the skimming mouth on the other side.

To avoid tilting down of the container and the feeding inlet, the tilting moment of the assembly of the container and the feeding inlet is preferably compensated partially. In this manner an effective balance can be given to the assembly, wherein the tilting moment is adapted to try to make the assembly to tilt toward an initial substantially standing orientation. Compensation of the tilting moment can be realized in different manners. Preferably the compensation is realized by means of one or multiple counterweights and/or by means of a spring, for example a coiled spring.

To avoid generation of an underpressure or an overpressure within the container during tilting, which may disturb the skimming process, the container is preferably provided with at least one air passage for aeration and/or de-aeration of the container. The air passage can be formed by a (tubed) connection between the container and the feeding inlet. Alternatively, an open end of the air passage can be in permanent contact with the atmosphere.

In a preferred embodiment, the discharge means comprises at least one pipe, about which the container is mounted tiltably, said pipe aligning with and coinciding with an axis of rotation of the container. In operation, the container will swivel back and forth about the axis through its asymmetrical tilting self-adjustment evolutions. The direction, and the angle of the swiveling movement result from the difference between the incoming flow into the container and the flow out through the effluent pipe. The construction provides a permanent self-adjusting, reliable and stable system, independent on the orientation of the container, which is sensitive to considerable flow and liquid level variations. Conventional prior art devices use discharge means which are not connected to the container such as a hose inserted into the container or the discharge means is connected to the container in such a way that it restricts movement of the container, that is, the discharge means, which can be a pipe or hose, is not in operational engagement with the container such that they act independently. Therefore these dated prior art devices incorporating known discharge means are inefficient. The axial alignment of the discharge pipe, which is independently operationally engaged with the container of the present invention eliminates this restriction of movement.

In another preferred embodiment, the apparatus comprises bearing means at the point of entry of the discharge pipe into the sidewall of the container that allows a circumferential tolerance gap or clearance between the bearing means, which can be a suitable friction reducing bearing, made from suitable polymeric material, such as a TEFLON® material, nylon material, etc., and the discharge pipe. The bearing may be in the form of an annular coupling attached to the sidewall of the container such that the aperture in the sidewall of the container is larger than the inside diameter of the bearing. In turn, it is preferred that the outside diameter of the discharge pipe entering the sidewall also be slightly less than the inside diameter of the bearing to provide for a circumferential gap that allows the liquid media to penetrate the gap into the container, thereby promoting the relative frictionless movement or uninhibited rotation of the container about the discharge pipe acting as the axis of rotation. In order to maintain its generally longitudinal orientation within the container and at the same time preventing the discharge pipe from axially displacing itself by coming out of the sidewall of the container, the opposite end of the discharge pipe is loosely and axially connected to the opposite sidewall of the container in a manner that also allows for free rotation of the opposite sidewall about the discharge pipe and further allows for a circumferential tolerance gap or predetermined clearance to allow liquid media to enter the container. This gap is preferably sufficiently large to allow contaminants suspended in the fluid media to enter the container through the gap spacing between the bearing and the discharge pipe. This feature prevents contaminants from settling around the joint area and inhibiting the free movement of the container about the discharge pipe.

Next to the aforementioned technical balancing, by using an adjustable counterweight mass, which may be angularly mounted in relation to the axis of the container for pumping or displacing, the balancing system may also be provided with sensor means. The latter are meant to maintain the fixedly adjusted position of the edge in order to guarantee an efficient discharge.

With conventional known devices, the problem occurs that a complete and controlled discharge of the floating top layer cannot be achieved in a single skimming off operation without carrying along with it substantial quantities of waste water. The invention now may overcome this problem by the application of a device in which a container for skimming off, which mainly consists of a flat bottom part, directing to the layer to be skimmed off, having connecting side walls, and a rear wall in which the container for skimming off at its bottom side merges into a recessed part, in which a discharge pipe is mounted, provided with an aperture, in such a way that the container is tiltable around the pipe, in which the direction of and the extent of tilt is determined by the difference between the quantity of the inflowing (skimmed off) layer into the container and the quantity, which is discharged through the pipe. By doing so, the device provides for a self adjusting stabilized system which automatically adapts itself to considerable fluctuations in the height level of the liquid or the delivered volume.

In a preferable embodiment, which guarantees the automatic adaptation of the device, a discharge pipe is supported in the side walls of the recessed part of the container for skimming off and the aperture, which is provided in the discharge pipe extends longitudinally between these side walls. For achieving optimal tilting movements of the container, in a favorable embodiment according to the invention, the container for skimming off is on one side wall provided with a bearing and sealing ring to which also the discharge pipe is made attachable. This makes it now possible that, in relation to the container, a protruding portion of the discharge pipe serves as a connecting sleeve e.g. to be coupled to a flexible discharge pipe of which the end portion may be mounted in a button end against the sliding ring without any friction, so as not to hinder the tilting movement of the skimming off container thereby. Another favorable embodiment of the device according to the invention is characterized in that one or more additional weight masses may be mounted to the skimming off container by which the extent of tilting movements may be altered.

Another embodiment of the invention is a device for continuously skimming off a floating top layer, e.g. a layer of oil or grease upon a flow of waste water, by means of a movable and floating skimming off container, characterized in that one or several skimming off containers are tiltably connected to a floating element. A favorable characteristic is that on either side of a floating element skimming off containers are tiltably connected to their discharge pipes with the floating element. Advantageous is the embodiment according to the invention which is characterized in that a floating element has a regular shape with a junction contact underneath for connecting a pipe or hose for discharging inflowing skimmed layers in the floating element from the containers.

In another preferred embodiment according to the invention is a device for continuously skimming off a floating top layer, e.g. a layer of oil or grease upon a flow of waste water, by means of a movable and floating skimming off container, characterized in that on either side of a skimming off container, several floating elements are attached to the skimming off container. Thereby, it is advantageous that the skimming off container is adjustably mounted to the floating elements.

BRIEF DESCRIPTION OF THE DRAWINGS

The invention can further be illustrated by way of the following non-limitative drawings, depicting various embodiments, wherein.

DETAILED DESCRIPTION OF THE INVENTION

Figure 1A:
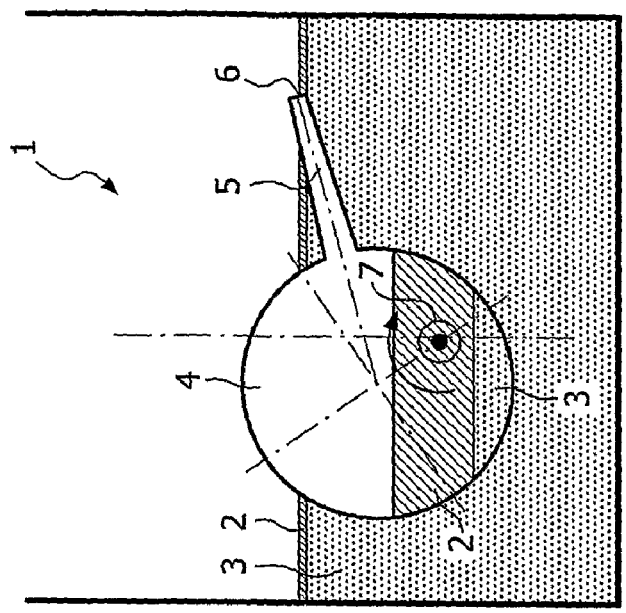
FIG. 1A shows a cross-section of an apparatus according to the invention in an substantially standing state.
Figure 1B:
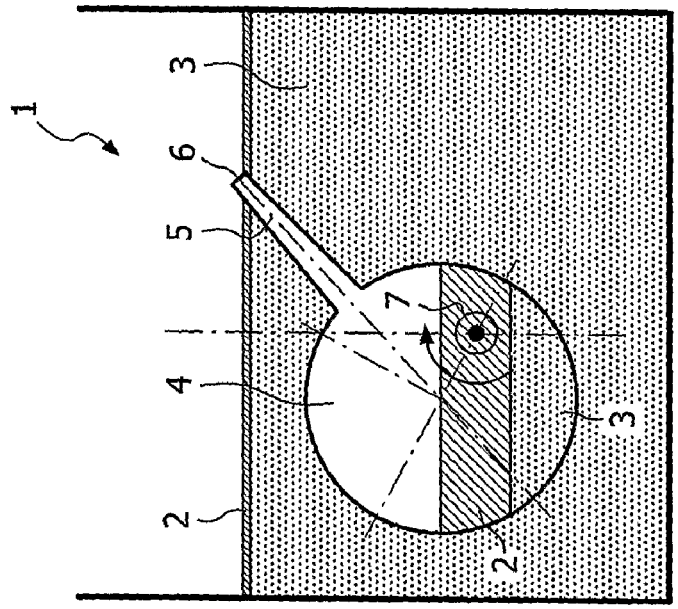
FIG. 1B shows a cross-section of the apparatus according to FIG. 1A in an intermediate state.
Figure 1C:
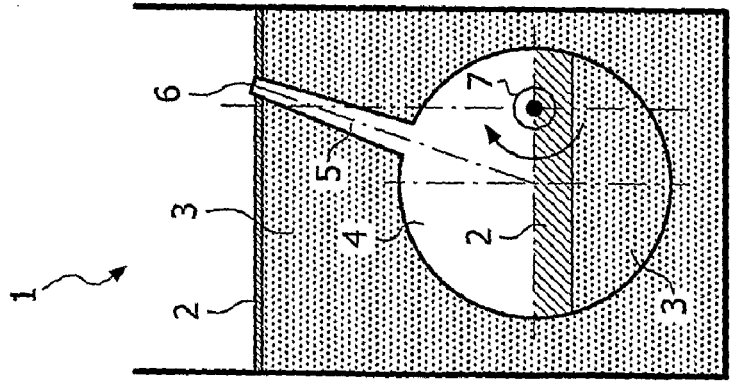
FIG. 1C shows a cross-section of the apparatus according to FIGS. 1A and 1B in an substantially lying state.

FIG. 1A shows a cross section of an apparatus 1 according to the invention in an substantially standing state. The apparatus 1 is suitable for skimming off a top layer 2, e.g. oil or grease, of a body of liquid 3, e.g. waste water. The apparatus 1 comprises a container 4, and a feeding inlet 5 coupled to said container 4. The feeding inlet 5 comprises a skimming mouth 6 for skimming off the top layer 2. The container 4 is mounted tiltable on a hollow discharge pipe 7 serving as discharge for the skimmed off top layer 2. The container 4 and the pipe 7 are mutually coupled in a sealingly, e.g. by means of a TEFLON threaded ring nut, and rotatably manner, wherein the container 4 and the feeding inlet 5 coupled thereto are adapted to have a self-adjusting capacity to seek an effective balanced position dependent on the liquid level. For this purpose, the container 4 has a substantially cylindrical geometry, and the pipe 7 is attached to an eccentric position of the container 4, such that the tilting moment of the container 4 caused by a buoyancy of the container 4, the buoyancy being a result of a liquid level differential, exceeds a frictional moment independent of the orientation of the container 4, the frictional moment being a result of the mutual cooperation of the container 4 and the discharge pipe 7. In this manner, jamming or blocking of the apparatus 1 can be prevented and a permanent self-adjusting capacity can be secured independent of the orientation of the container 4 and the feeding inlet 5 coupled thereto. In the embodiment shown, the apparatus 1 and in particular the container 4 and the discharge pipe 7 are oriented in a substantially standing state. In FIGS. 1B and 1C the container 4 and the feeding inlet 5 have been tilted clockwise due to a decrease of the level liquid. In the substantially lying state of the container 4 and the feeding inlet 5, (see FIG. 1C) the volume of the top layer 2 (and eventually a fraction of liquid 3) skimmed off and contained in the container 4 is minimized, resulting in a minimized tilting moment, wherein the tilting moment is caused by the buoyancy of the container 4 in case of a rise of the liquid level causing flow from the body of liquid 3 and the top layer 2 into the container 4. However, under normal operating conditions, this generated minimized tilting moment always exceeds the frictional moment independent of the orientation of the container 4, thereby securing a permanent self-adjusting capacity of the apparatus 1.

Figure 2:
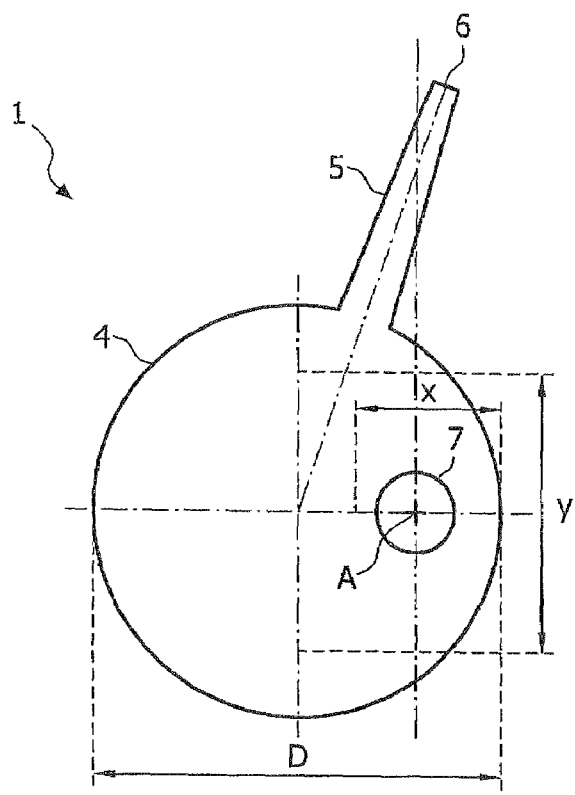
FIG. 2 shows a conceptual detailed view of an example of the apparatus according to FIG. 1A-1C.

FIG. 2 shows a detailed view of the apparatus 1 according to FIGS. 1A-1C. As shown in FIG. 2, the tubular or tube-shaped feeding inlet 5 is formed by an elongated spout or nozzle, which is connected to the container 4, such that the elongated tubular or tube-shaped feeding inlet 5 and the container 4 together enclose a joint collecting volume for collecting the skimmed off substance. This substance can subsequently be discharged by the discharge pipe 7. The discharge pipe 7 thereby also functions as suspension element for the container 4. Commonly, an open inlet of the pipe 7 is directly coupled to said container 2. However, it is also conceivable that the open inlet of the pipe 7 is connected to a (flexible) hose which is in fluid communication with the volume enclosed by the container 4. The hose can thereby even be brought into the feeding inlet 5 to suction the skimmed off substance out of the container 4. In the embodiment shown, the axis of rotation (A) is positioned at the center pipe 7. The axis of rotation (A) is thereby situated eccentrically, wherein horizontal position ("X"-cordinate) of the axis of rotation (A) measures at least ⅔ times the diameter (D) of the container 4, and wherein the vertical position ("Y"-cordinate) measures at the most ⅓ times the diameter (D) of the container. Reference for these co-ordinates is formed by the center of the cross-section of the container 4. Since the container is mounted tiltably on the pipe 7, the gravitational force applied on the container 4 and the feeding inlet 5 results in a tilting moment to forcing the container 4 to tilt in a counter clockwise direction. Commonly, this tilting moment needs to be compensated by means of a counter weight and/or by means of a bias (not shown). However, this compensation force needs to be of such magnitude that the container 4 and the feeding inlet 5 will have a permanent tilting moment forcing to make the container 4 and the feeding inlet 5 to tilt in a counter-clockwise direction, wherein said (partially compensated) tilting moment must be sufficiently large to allow the container 4 and the feeding inlet 5 to return to the initial (substantially standing) state as shown, independent on the state of the container 4 and the feeding inlet 5. Alternatively, the tilting moment could be completely compensated by counterweights, wherein a bias means, such as spiral spring or coiled spring, is applied to generate a desired counter compensation of the counterweights.

Figure 3:
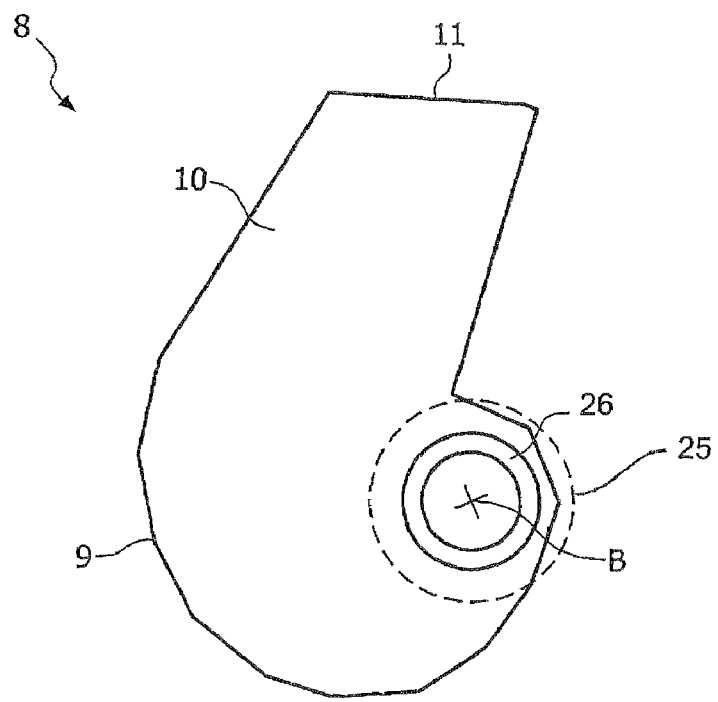
FIG. 3 shows a conceptual detailed view of an example of another apparatus according to the invention.

FIG. 3 shows a detailed view of another apparatus 8 according to the invention. The operation and functionality of the apparatus 8 have been elucidated already above in a comprehensive manner. In the embodiment shown in FIG. 3, the apparatus 8 comprises a container 9 and a feeding inlet 10 coupled to said container 9. The feeding inlet 10 is provided with a skimming mouth 11 for skimming off a top layer of a body of liquid. The assembly of the container 9 and the feeding inlet 10 thereby has a substantially scroll-shaped or voluted geometry. As mentioned above, preferably, the container is substantially scroll-shaped (that is, generally 6-shaped or σ-shaped) or voluted, wherein the container can be formed by a scroll case. In a peripheral part of the container 9, the container 9 is attached to a discharge pipe 26 by means of a bearing 25 in a sealing and rotatable manner. The center of rotation is indicated by character B. In the illustrative embodiment the feeding inlet 10 is relatively wide, which is commonly advantageous during cleaning and unclogging activities. The feeding inlet 10 is connected to the container 9 in a gradual manner, thereby facilitating manufacturing of the apparatus 8.

Figure 4:
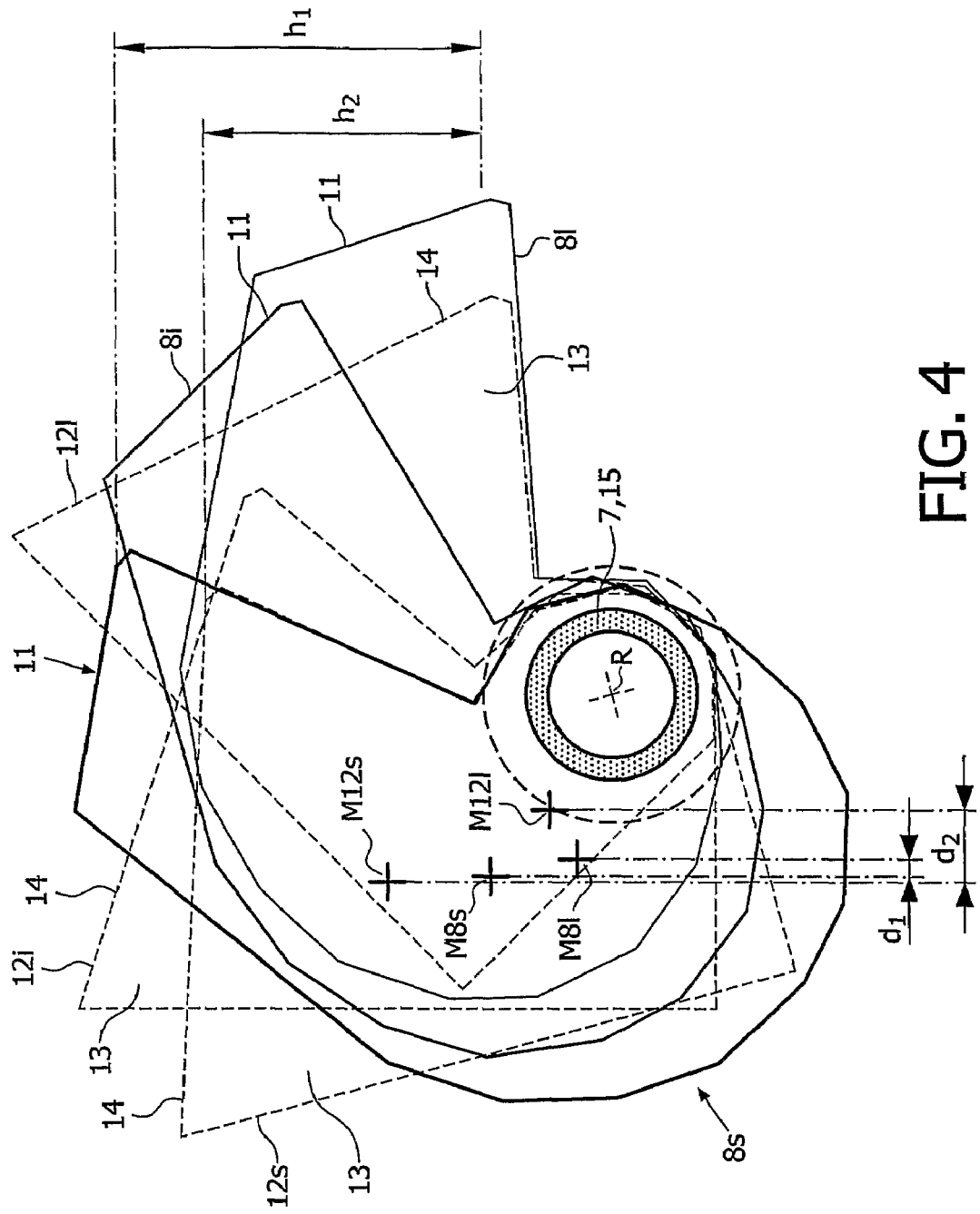
FIG. 4 shows a comparative view of the apparatus according to FIG. 3 and a conventional apparatus known from the prior art.

FIG. 4 shows a comparative view of the apparatus 8 according to FIG. 3 and a conventional apparatus 12 known from the prior art. In this comparative view the apparatus 8 according to the invention and the known apparatus 12 have an identical collecting volume. Both apparatus 8, 12 are shown in three states; a substantially standing state, an intermediate state, and a substantially lying state, which states are successively indicated by characters s (standing), i (intermediate), and l (lying). The known apparatus 12 has an angular geometry, and comprises a collecting container 13 provided with a skimming edge 14, wherein said collecting container 13 is mounted tiltably on a discharge pipe 15 (like the apparatus 8 according to the invention). In this figure the discharge pipes 7, 15 are projected in line. The tilting moment M8(s), M8(1), M12(s), M12(1) caused by the center of the driving volume (situated at a distance of the axis of rotation R) is indicated in this figure for both apparatus 8, 12 and for both the substantially standing state and the substantially lying state. As can be seen in FIG. 4, the tilting moment M8(s), M8(1) of the apparatus 8 according to the invention slightly changes by going from one extreme state to an opposite extreme state (see $d_1$), while the tilting moment M12(s), M12(1) of the known apparatus 12 changes considerably by going from one extreme state to an opposite extreme state (see $d_2$). It may be clear these changes are inherently coupled to the design of the apparatus 8, 12, and that the tilting moment of the improved apparatus 8 according to the invention is more stable. This more stable tilting moment leads on one side to a reliable apparatus 8 with a permanent self-adjusting capacity, wherein the risk of blocking or jamming due to an insufficient tilting moment can be prevented. Moreover, the improved apparatus 8 incorporates another major advantage. As can be seen in FIG. 4, the maximum displacement $h_1$ of the skimming mouth 11 of the apparatus 8 according to the invention is significant larger than the maximum displacement $h_2$ of the skimming edge 14 of the known apparatus 12, while the internal collecting volumes of both apparatus 8, 12 are identical. For this reason, the apparatus 8 according to the invention is sensitive to considerable flow and liquid level variations, in contrary with the known apparatus 8 which is merely sensitive for limited flow and liquid variations.

Figure 5:
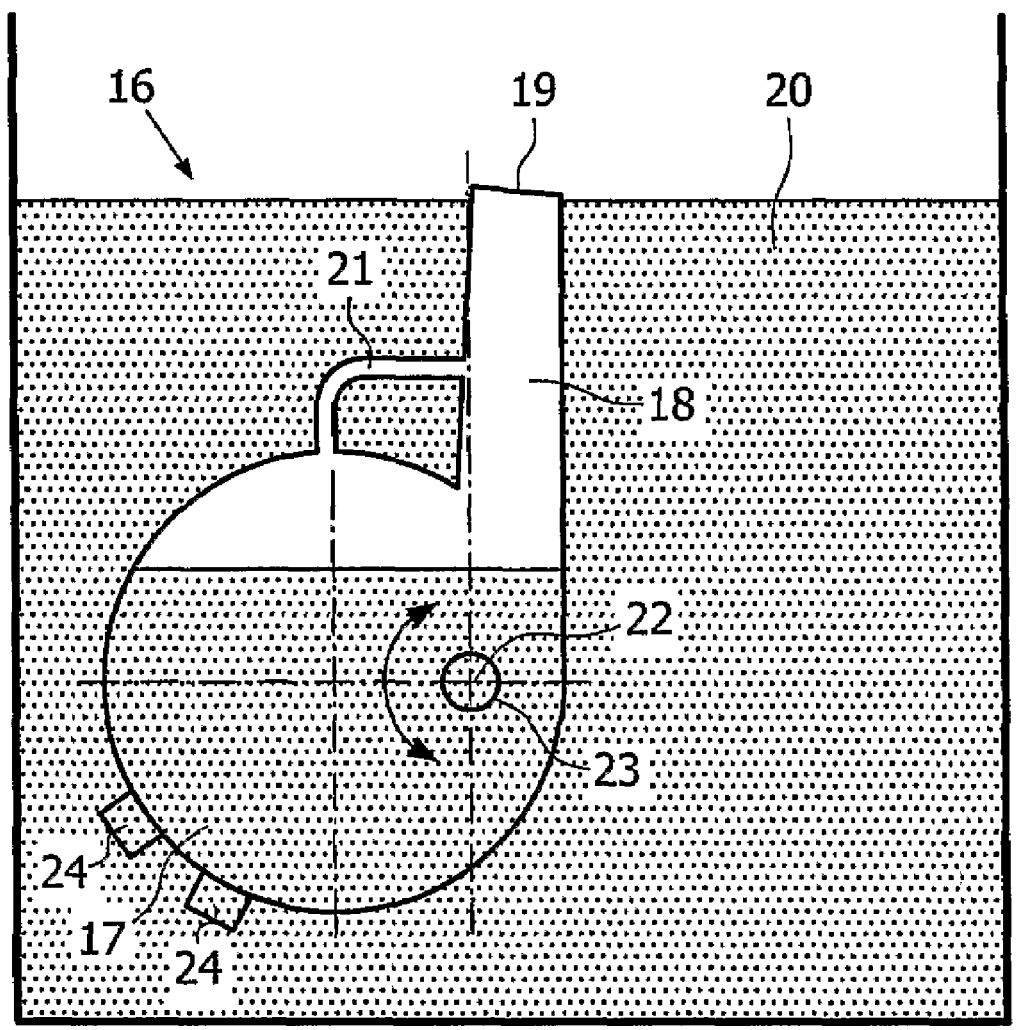
FIG. 5 shows a cross-section of an alternative apparatus according to the invention.

FIG. 5 shows a cross-section of an alternative apparatus 16 according to the invention. The apparatus 16 comprises a self-adjusting cylindrical container 17, and a feeding inlet 18 coupled to said container 17. The feeding inlet 18 is provided with a skimming mouth 19 for skimming off a top layer (not shown) of a body of liquid 20. An air passage 21 is provided between the container 17 and the feeding inlet 18 for (de)aeration of the container 17 to prevent generation of the overpressure and/or underpressure within the container 17 which may disturb the skimming process. The container 17 is eccentrically rotatable about a rotation axis 22 (see arrow) around which a discharge means 23, like for example a pipe, is positioned. The container 17 is provided with multiple counterweights 24 to partially compensate the tilting moment of the container 17 to prevent tilting down of the container 17 and to force the container 17 to move to the standing state as shown.

The apparatus 16 shown in this FIG. 5 is particularly advantageous for its sensitivity for relatively large flow and liquid level variations compared to this sensitivity of the apparatus 1 shown in FIGS. 1A-1C and 2.

It should be noted that the above-mentioned description and drawings are mainly conceptual examples of various embodiments of the invention and are not intended to limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

What is claimed is:

1. An apparatus for continually skimming off a top layer of a body of liquid, comprising:
    a self adjusting container for collecting a top layer of a body of liquid, said container being adapted to seek an effective balanced position dependent on the liquid level for collecting the top layer;
    means for discharging the top layer collected by said container, said container being tiltably coupled to said means for discharging the collected top layer;
    the container being designed such that the tilting moment of the container caused by a buoyancy of the container, the buoyancy being a result of a liquid level differential, exceeds a frictional moment independent of the orientation of the container, the frictional moment being a result of the mutual cooperation of the container and the discharge means; and
    an elongated tubular feeding inlet coupled to said container for skimming the top layer of said body of liquid and feeding the container with the skimmed top layer, said elongated tubular feeding inlet having a volume smaller than a volume of the container, wherin said feeding inlet comprises a skimming mouth, said mouth being positioned at a distance from the container.

2. The apparatus according to claim 1, wherein said container encloses a collecting volume connected to said feeding inlet, said collecting volume extending to and beyond a side of the discharge means opposite to a skimming mouth, said mouth being positioned at a distance of the container.

3. The apparatus according to claim 2, wherein the feeding inlet comprises opposite side walls, an upper wall, and a lower wall opposite to said upper wall, the edges of which walls defining the mouth.

4. The apparatus according to claim 3, wherein the upper wall and a lower wall are oriented, so as to be tapered in direction of the mouth.

5. The apparatus according to claim 1 wherein the container is generally scroll-shaped.

6. The apparatus according to claim 1, wherein the tilting moment of the container is at least partially compensated by means for compensating said momentum.

7. The apparatus according to claim 1, wherein the container is provided with at least one air passage for aeration and/or de-aeration of the container.

8. The apparatus according to claim 1, wherein the discharge means comprises at least one pipe, about which the container is mounted tiltably, said pipe aligning with and coinciding with an axis of rotation of the container.

9. The apparatus according to claim 8, wherein the pipe is fixed in at least one wall of the container.

10. The apparatus according to claim 8, wherein the pipe is mounted to at least one floating element.

11. The apparatus according to claim 8, wherein a portion of the pipe extending inside the container has means for receiving the top layer being skimmed into the container.

12. The apparatus according to claim 11, wherein the means for receiving the top layer being skimmed into the container is at least one aperture through which the collected top layer may enter the pipe.

13. The apparatus according to claim 12, wherein the means for receiving the top layer being skimmed into the container is at least one elongate aperture extending over a predetermined width of the container through which the collected top layer may enter the pipe.

14. The apparatus according to claim 1, wherein the container has at least one floating element pending on either side of the container, the floating elements being mounted by means of a frame structure and the container being capable of maintaining independent rotational movement.

15. The apparatus according to claim 14, wherein the apparatus comprises multiple containers mounted to the at least one floating element.

16. The apparatus according to claim 14, wherein the container is adjustably connected to the at least one floating element.

17. The apparatus according to claim 1, wherein the container tilts about the discharge means by bearing means, the discharge means and the bearing means having a predetermined clearance therebetween for minimizing frictional contact between the container and the discharge means.

18. The apparatus according to claim 17, wherein the bearing means is an annular coupling, and the clearance is sufficient to allow leakage flow from the body of liquid into the container.

19. The apparatus according to claim 18, wherein the annular coupling is made from a friction reducing material.

* * * * *